United States Patent
Zane et al.

(10) Patent No.: US 8,682,853 B2
(45) Date of Patent: Mar. 25, 2014

(54) SYSTEM AND METHOD FOR ENHANCING STORAGE PERFORMANCE IN ANALYTICAL DATABASE APPLICATIONS

(75) Inventors: Barry M. Zane, La Jolla, CA (US); David Steinhoff, Ann Arbor, MI (US)

(73) Assignee: Paraccel LLC, Campbell, CA (US)

( * ) Notice: Subject to any disclaimer, the term of this patent is extended or adjusted under 35 U.S.C. 154(b) by 546 days.

(21) Appl. No.: 12/122,579

(22) Filed: May 16, 2008

(65) Prior Publication Data

US 2009/0287747 A1    Nov. 19, 2009

(51) Int. Cl.
*G06F 7/00* (2006.01)
*G06F 17/00* (2006.01)

(52) U.S. Cl.
USPC .......................................... 707/644; 707/651

(58) Field of Classification Search
CPC ................................................ G06F 17/30224
USPC ................................................. 707/644, 651
See application file for complete search history.

(56) References Cited

U.S. PATENT DOCUMENTS

| | | | |
|---|---|---|---|
| 5,845,276 A | 12/1998 | Emerson et al. | 707/2 |
| 6,453,316 B1 * | 9/2002 | Karibe et al. | 1/1 |
| 6,810,396 B1 | 10/2004 | Blumenau et al. | |
| 6,950,848 B1 | 9/2005 | Yousefi'zadeh | 709/203 |
| 7,024,414 B2 | 4/2006 | Sah et al. | 707/101 |
| 7,197,519 B2 * | 3/2007 | Nishikawa et al. | 1/1 |
| 7,249,118 B2 | 7/2007 | Sandler et al. | 707/1 |
| 7,409,588 B2 | 8/2008 | Yako et al. | 714/15 |
| 2002/0004799 A1 | 1/2002 | Gorelik et al. | 707/201 |
| 2002/0049759 A1 * | 4/2002 | Christensen | 707/10 |
| 2003/0145180 A1 | 7/2003 | McNeil | |
| 2003/0195940 A1 | 10/2003 | Basu et al. | 709/213 |
| 2003/0204510 A1 | 10/2003 | Ball et al. | 707/100 |
| 2003/0212789 A1 | 11/2003 | Hamel et al. | 709/225 |
| 2004/0186829 A1 | 9/2004 | Suzuki et al. | |
| 2005/0256908 A1 | 11/2005 | Yang et al. | 707/200 |
| 2006/0004839 A1 | 1/2006 | Nagasawa et al. | |
| 2006/0020580 A1 | 1/2006 | Dettinger et al. | 707/3 |
| 2006/0080285 A1 | 4/2006 | Chowdhuri | |
| 2007/0136238 A1 * | 6/2007 | Bildhaeuser et al. | 707/2 |
| 2008/0034205 A1 | 2/2008 | Alain et al. | 713/160 |

(Continued)

FOREIGN PATENT DOCUMENTS

| | | |
|---|---|---|
| WO | WO 2005/098655 | 10/2005 |
| WO | WO 2008/038271 A1 | 4/2008 |
| WO | WO 2008/140937 | 11/2008 |
| WO | WO 2009/140038 | 11/2009 |

OTHER PUBLICATIONS

Ravishankar Ramamurthy et al., "A Case for Fractured Mirrors", *Proceedings of the 28th VLDB Conference*, Hong Kong, China, 2002, XP009104035, 12 pages.

(Continued)

*Primary Examiner* — Mariela Reyes
(74) *Attorney, Agent, or Firm* — Fenwick & West LLP

(57) ABSTRACT

A system and method for enhancing data throughput in data warehousing environments by connecting multiple servers having local storages with designated external storage systems, such as, for example, those provided by SANs. The system and method may preserve a full reference copy of the data in a protected environment (e.g., on the external storage system) that is fully available. The system and method may enhance overall I/O potential performance and reliability for efficient and reliable system resource utilization.

18 Claims, 6 Drawing Sheets

(56) References Cited

U.S. PATENT DOCUMENTS

| | | | |
|---|---|---|---|
| 2008/0162590 A1 | 7/2008 | Kundu et al. | 707/202 |
| 2008/0281784 A1 | 11/2008 | Zane et al. | 707/3 |
| 2008/0320059 A1 | 12/2008 | Schmidt et al. | |
| 2011/0035368 A1 | 2/2011 | Cole et al. | 707/714 |
| 2011/0106767 A1 | 5/2011 | Zane et al. | 707/645 |

OTHER PUBLICATIONS

Biplob Kumar Debnath et al., "A Survey of Techniques Used to Reduce the Semantic Gap Between Database Management Systems and Storage Subsystems", *Final Project Report,* Nov. 28, 2006, XP009104006, 16 pages.

Stavros Harizopoulos et aL, "Performance Tradeoffs in Read-Optimized Databases", *Proceedings of VLDB 2006,* Sep. 12, 2006, Seoul, Korea, XP009104040, pp. 487-498.

Anastassia Ailamaki et al., "Weaving Relations for Cache Performance", *Proceedings of the 27th VLDB Conference,* Rome, Italy, 2001, XP009104041, 12 pages.

Andrew S. Tanenbaum, "Computer Networks, Third Edition", Prentice Hall PTR, Jan. 1, 1996, XP002929437, 41 pages.

J. Postel et al., "RFC 959, Request for Comments, File Transfer Protocol", Network Working Group Request for Comments, Oct. 1, 1985, XP-002151678, 69 pages.

Ravishankar Ramamurthy et al., "A Case for Fractured Mirrors", *The VLDB Journal,* vol. 12, No. 2, Aug. 2003, pp. 89-101.

Theodore Chen, "Cover Letter to James Gatto at Pillsbury et al. re: Correct Inventorship for U.S. Appl. No. 12/122,579 Storage Performance Optimization", Feb. 23, 2011, pp. 1-2.

David Steinoff, "Email to Bob Goldsand regarding Discussion Points", Apr. 17, 2008, p. 1.

James G. Gatto, "Cover Letter to Theodore Chen at EMC Corporation re: Inventorship for U.S. Appl. No. 12/122,579 Storage Performance Optimization", Mar. 1, 2011, pp. 1-2.

Theodore Chen, "Cover Letter to James Gatto at Pillsbury et al. re: Correct Inventorship for U.S. Appl. No. 12/122,579 Storage Performance Optimization", Mar. 8, 2011, pp. 1-2.

Barry Zane, "Email to Bob Goldsand re: EMC Configs", Apr. 17, 2007 @ 1:46:55 PM, p. 1.

EMC Configus Powerpoint, pp. 1-6.

Bob Goldsand, "Email to David Ehrlich, Kim Stanick, Barry Zane and David Walters at Paraccel re: EMC Presentation & SAN for ParAccel IT", Jan. 17, 2008 @ 9:18:26 PM, pp. 1-5.

David Ehrlich, "Email to Kim Stanick, Bob Goldsand, Barry Zane and David Walters re: EMC Presentation & SAN for ParAccel IT", Jan. 17, 2008 @8:47:48 PM, pp. 1-4.

Kim Stanick, "Email to Bob Goldsand, Barry Zane, Tim Milovich re: EMC- ParAccel Scalable Analytic Appliance NDA Analysts050608b,ppt", May 8, 2008 @ 10:20:31 PM, p. 1.

$EMC^2$ , "The Scalable Analytic Appliance Powered by EMC and ParAccel Powerpoint", 2008, pp. 1-9.

European Extended Search Report, European Application No. 09747124.7, Mar. 20, 2012, 11 pages.

Lei, M. et al., "An On-Line Replication Strategy to Increase Availability in Data Grids," Future Generations Computer Systems, 2008, pp. 85-98, vol. 24, No. 2.

PCT International Search Report and Written Opinion, PCT Application No. PCT/US09/41486, Jun. 30, 2009, 8 pages.

United States Office Action dated Nov. 4, 2011, U.S. Appl. No. 12/986,969, 9 pages.

\* cited by examiner

SYSTEM AND METHOD FOR ENHANCING STORAGE PERFORMANCE IN ANALYTICAL DATABASE APPLICATIONS

FIELD OF THE INVENTION

The invention relates to management of data storage in a "database aware" distributed data environment where both local and remote storage systems are used simultaneously to fulfill IO requests.

BACKGROUND OF THE INVENTION

In traditional data warehousing and Data Mart (DM) environments, data is stored centrally on an External Storage System (ESS), such as, for example, a Storage Area Network (SAN), or locally. A single access point is typically configured in order to provide security (e.g., an ESS) or performance (e.g., access locally), but usually is not able to provide both economically. While an ESS can guarantee security, it may be prohibitively expensive to also provide performance in situations involving high data volumes or IO intensive applications. Conversely, local storage systems typically have high data throughput capabilities, but are not able to store high data volumes effectively or guarantee security without sacrificing storage capacity through excessive redundancy.

Parallel warehousing and DM environments present both opportunities and additional overhead in environments that rely on single storage configurations. Shared-nothing parallel database systems relying on local storage must develop sophisticated solutions for failover recovery (FR) and disaster recovery (DR). Such systems can double or quadruple storage requirements, hence reduce capacity on each server, which can lead to a proliferation of servers or reduced system capacity. Shared-storage parallel database systems (e.g., implementing an ESS) typically rely on centralized high-availability and security services, which reduces the FR and DR infrastructure complexity of parallel solutions, but at the cost of reduced data throughput. This may lead to inefficient use of the parallel systems, limit the expansion capabilities of the system, significantly reduce the system's ability to scale linearly to support increasing data volumes and application demands from expanded user requirements, and/or other drawbacks.

SUMMARY OF THE INVENTION

One aspect of the invention relates to systems and methods that seek to optimize (or at least enhance) data throughput in data warehousing environments by connecting multiple servers having local storages with a designated ESS, such as, for example, a SAN. According to another aspect of the invention, the systems and methods preserve a full reference copy of the data in a protected environment (e.g., on the ESS) that is fully available. According to another aspect of the invention, the systems and methods maximize (or at least significantly enhance) overall IO potential performance and reliability for efficient and reliable system resource utilization.

Other aspects and advantages of the invention include providing a reliable data environment in a mixed storage configuration, compensating and adjusting for differences in disk (transfer) speed between mixed storage components to sustain high throughput, supporting different disk sizes on server configurations, supporting high performance FR and DR in a mixed storage configuration, supporting dynamic reprovisioning as servers are added to and removed from the system configuration and supporting database clustering in which multiple servers are partitioned within the system to support separate databases, applications or user groups, and/or other enhancements. Servers within the data warehousing environment may be managed in an autonomous, or semi-autonomous, manner, thereby alleviating the need for a sophisticated central management system.

According to some embodiments, a system may include one or more of an ESS, one or more servers, local storage associated with individual ones of the servers, one or more clients, and/or other components. The ESS may hold an entire copy of the database. The local storage at individual ones of the servers may hold a portion of the database. A given server may manage the storage of data within the corresponding local storage, and may manage the retrieval of data from the ESS and/or the corresponding local storage. A given client may be operatively linked with a server, and may provide an interface between the database and one or more users and/or administrators.

The ESS may hold a copy of the entire database. This copy may be kept current in real-time, or near real-time. As such, the copy of the database held by the ESS may be used as a full reference copy for FR or DR on portions of the database stored within the local storage of individual servers. Since the copy of the ESS is kept continuously (or substantially so) current, "snapshots" of the database may be captured without temporarily isolating the ESS artificially from the servers to provide a quiescent copy of the database. By virtue of the centralized nature of the ESS, the database copy may be maintained with relatively high security and/or high availability (e.g., due to standard replication and striping policies). In some implementations, the ESS may organize the data stored therein such that data that is accessed more frequently by the servers (e.g., data blocks not stored within the local storages) is stored in such a manner that it can be accessed efficiently (e.g., for sequential read access). In some instances, the ESS may provide a backup copy of portions of the database that are stored locally at the servers.

The local storages corresponding to individual ones of the servers store part of the database contained within the ESS. The storage system architecture and/or configuration of the individual local storages is not specified by the overall system. For example, separate local storages may be provided by different types of storage devices and/or such storage devices may have different configurations. In some implementations, a given local storage may be partitioned to provide storage for other applications as well as the system described herein.

The servers may form a network of server computer nodes, where one or more leader nodes communicate with the client to acquire queries and deliver data for further processing, such as display, and manages the processing of queries by a plurality of compute node servers. Individual servers process queries in parallel fashion by reading data simultaneously from local storage and the ESS to enhance I/O performance and throughput. The proportions of the data read from local storage and the ESS, respectively, may be a function of (i) data throughput between a given server and the corresponding local storage, and (ii) data throughput between the ESS and the given server. In some implementations, the proportions of the data read out from the separate sources may be determined according to a goal of completing the data read out from the local storage and the data read out from the ESS at approximately the same time. Similarly, the given server may adjust, in an ongoing manner, the portion of the database that is stored in the corresponding local storage in accordance with the relative data throughputs between the server and the local storage and between the server and the ESS (e.g., where the throughput between the server and the local storage is relatively high compared to the throughput between the server and the ESS, the portion of the database stored on the local storage may be adjusted to be relatively large). In some implementations, the individual servers may include one or more of a database engine, a distributed data manager, a I/O system, and/or other components.

The clients may operatively connect to the servers, and may generate database queries that are routed to the servers. Results of the queries (generated by processing on the server) may be sent to the client for disposition and display processing.

According to various embodiments, data may be loaded from an external data source (e.g., via a client) to the database. A method of loading such data to the database may include receiving the data from the external data source, organizing the received data (e.g., into data blocks), writing the received data into the database held in the ESS, and/or writing portions of the received data into the individual local storages by the individual servers.

In some embodiments, queries received from the client may be processed by the servers. A method of receiving and processing such a query may include receiving a query from a client, distributing the query amongst the servers for processing, at individual servers, determining the amount of data that should be read from local storage and the amount that should be read from the ESS, reading the data out of local storage and the ESS, processing the received data, and/or returning results of the processing to the client. Where the processing of the received data involves the materialization of intermediate data, on a given one of the servers such data may be stored in local storage and/or stored in the ESS based on user configurable settings. In some implementations, the user configurable settings may depend on one or more criteria, such as, for example, capacity utilization, throughput balancing, and/or storage balancing.

In some embodiments, data within the database may be updated and/or deleted (e.g., as data is deleted and/or updated in an external data source). A method for reflecting such changes in the data may include receiving the update and/or deletion, updating and/or deleting the corresponding data (e.g., rows, elements, etc.) within the database copy stored in the ESS, updating the database portions stored by the various local storages corresponding to the servers, and/or adjusting the storage of data within the individual local storages to maintain the balance between the individual local storages and the ESS. In some implementations, a vacuum command may be initiated on one or more of the servers that vacuums the corresponding local storages to remove discontinuities within the portions of the database stored within the local storages that are caused by the updating and/or deleting of data from the stored database portions.

In some embodiments, snapshots of the database may be captured from the ESS. A snapshot may include an image of the database that can be used to restore the database to its current state at a future time. A method of capturing a snapshot of the database may include, monitoring a passage of time since the previous snapshot, if the amount of time since the previous snapshot has breached a predetermined threshold, monitoring the database to determine whether a snapshot can be performed, and performing the snapshot. Determining whether a snapshot can be performed may include determining whether any queries are currently being executed on the database and/or determining whether any queries being executed update the persistent data within the database. This may enhance the capture of snapshots with respect to system in which the database must isolated from queries, updated from temporary data storage, and then imaged to capture a snapshot because snapshots can be captured during ongoing operations at convenient intervals (e.g., when no queries that update the data are be performed).

In some implementations, snapshots of the database may be captured by keeping multiple tables of contents of the blacklist of the database. The table of contents may include the storage address of the data blocks and possibly other block attributes. The table of contents operates in such a manner that when a snapshot is requested, the current table of contents is saved and becomes the snapshot table of contents. A new table of contents is created that initially contains the same information as the snapshot table of contents, but any changes to the database are make made by creating new blocks which are only referenced by the new table of contents. In this embodiment, any number of tables of contents may be created, one for each snapshot. To achieve consistency of the database snapshot across all servers in a multi-server database system, the snapshot may be performed on all servers with no intervening block data writes during the interval in time from the snapshot of the first server's table of content until the snapshot is complete for the last server's table of contents.

In some implementations, snapshots of the database may be captured by utilizing a number of tables of contents where each table of contents includes the size of each data block in addition to the storage address of the block and possibly other block attributes. In such implementations, a database transaction, such as, for example, SQL commit, is performed by writing an additional table of contents that includes the new block sizes. The older tables of content refer to the database state, pre-commit, because they contain the block sizes as they existed before any writes by the transaction being committed. The newer table of contents may include blocks that have been created by the transaction and may exclude blocks that have been abandoned by the transaction. In this embodiment, a snapshot to the ESS may be performed at any time during database operation except the short interval starting from the first server's creation of the table of contents to the last server's completion of creation of its table of contents.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION OF THE INVENTION

Figure 1:
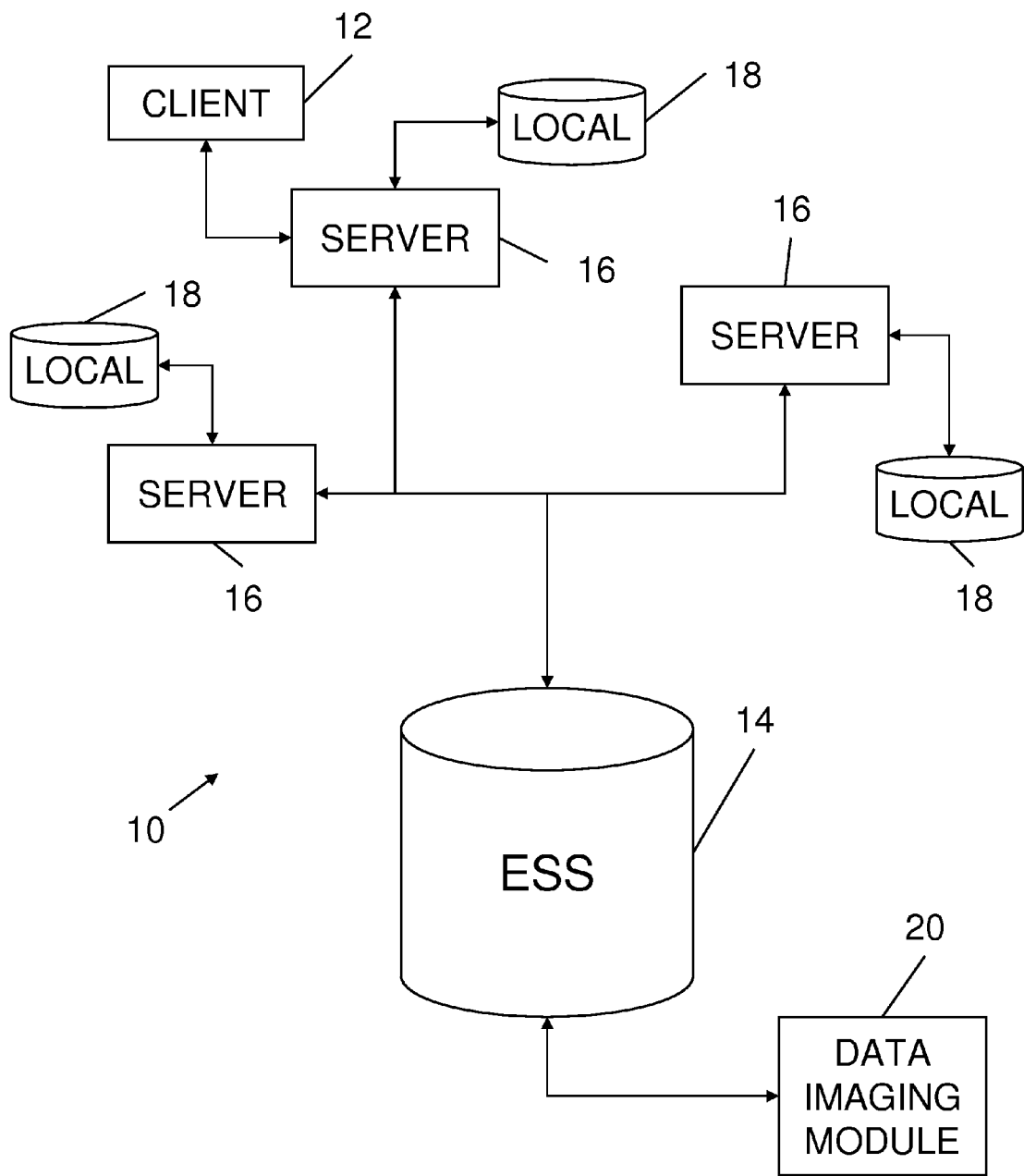
FIG. 1 illustrates a system configured to provide a database, in accordance with one or more embodiments of the invention.

FIG. 1 illustrates a system 10 configured to provide a database, in accordance with one or more implementations of the invention. System 10 may enhance access of the database by increasing overall data throughput of system 10 in processing queries on the database. System 10 may provide enhancements in one or more of security, FR, DR, and/or other aspects of the database at least in part through a mixed storage configuration. As can be seen in FIG. 1, in some implementations, system 10 may include one or more of a client 12, an ESS 14, one or more servers 16, local storage 18 corresponding to individual ones of servers 16, and/or other components.

Clients 12 may be operatively connected to servers 16, and may generate database queries that are routed to servers 16. Results of the queries (generated by processing on the server) may be sent to the querying client 16 for disposition and display processing. In some implementations, client 12 may be provided on a computing platform, such as, for example, a desktop computer, a laptop computer, a handheld computer, a mobile telephone, a personal digital assistant, and/or other computing platforms. Client 12 may providing an interface for users to interact with the database.

ESS 14 may include an external storage system capable of holding a copy of the entire database. For example, in some implementations, ESS 14 may include a SAN. The copy of the database held on ESS 14 may be kept current in real-time, or near real-time. As such, the copy of the database held by ESS 14 may be used as a full reference copy for FR or DR on portions of the database stored within the local storages 18 of individual servers 16. Since the copy of the database held by ESS 14 is kept continuously (or substantially so) current, "snapshots" of the database may be taken by an data imaging module 20 without temporarily isolating ESS 14 from servers 16 in order to ensure that the database will be quiescent. By virtue of the centralized nature of ESS 14, the database copy may be maintained thereon with relatively high security and/ or high availability (e.g., due to standard replication and striping policies). In some implementations, ESS 14 may organize the data stored therein such that data accessed more frequently by servers 16 in the manner discussed below (e.g., data blocks not stored within the local storages) may be stored so that it can be accessed more efficiently than data that is requested by servers 16 with less frequency (e.g., for sequential read access). In some instances, the copy of the database held on ESS 14 may not only provide for access by server 16 to data within the database to process queries, but may also provide a backup copy for FR and/or DR on portions of the database stored on local storages 18 locally to servers 16. As such, the commitment of data to the database copy held on ESS 14 may constitute commitment of the data and backup of the data in a single operation.

As has been mentioned above, data imaging module 20 may operate to capture snapshots of the database. A snapshot may include a data image of the database that can be used to restore the database to its current state at a future time. Data imaging module 20 may monitor one or more parameters to determine if a snapshot should be captured. In some instances, the one or more parameters may include one or more of an amount of time, a number of querying operations performed on the database, an amount of information added, deleted, and/or updated within the database, and/or other parameters related to the obsolescence of the previous snapshot. For example, if the parameter is an amount of time, data imaging module may determine if an amount of time that has passed since the previous snapshot has breached a predetermined threshold. This predetermined threshold may be configurable (e.g., by a system administrator).

If the threshold of the parameter (e.g., the amount of time since the previous snapshot, etc.) has been breached, data imaging module 20 may monitor the database to determine whether a snapshot can be performed. Determining whether a snapshot can be performed may include determining whether any queries are currently being executed on the database and/or determining whether any queries being executed update the persistent data within the copy of the database stored in ESS 14. Upon determining that a snapshot can be performed data imaging module 20 may capture a snapshot of ESS 14 without manually isolating ESS 14 from the rest of system 10. This may enhance the capture of snapshots with respect to a system in which the database must be manually isolated from queries, updated from temporary data storage, and then imaged to capture a snapshot because snapshots can be captured by data imaging module 20 during ongoing operations at convenient intervals (e.g., when no queries that update the data are be performed).

In some implementations, snapshots of the database may be captured by keeping multiple tables of contents of the blacklist of the database. The table of contents may include the storage address of the data blocks and possibly other block attributes. The table of contents operates in such a manner that when a snapshot is requested, the current table of contents is saved and becomes the snapshot table of contents. A new table of contents is created that initially contains the same information as the snapshot table of contents, but any changes to the database are make made by creating new blocks which are only referenced by the new table of contents. In such implementations, any number of tables of contents may be created, one for each snapshot. To achieve consistency of the database snapshot across all servers 16 in system 10, the snapshot may be performed on substantially all servers 16 with no intervening block data writes during the interval in time from the snapshot of the first server's table of content until the snapshot is complete for the last server's table of contents.

In some implementations, snapshots of the database may be captured by utilizing a number of tables of contents where each table of contents includes the size of each data block in addition to the storage address of the block and possibly other block attributes. In such implementations, a database transaction, such as an SQL commit, is performed by writing an additional table of contents that includes the new block sizes. The older tables of content refer to the database state, pre-commit, because they contain the block sizes as they existed before any writes by the transaction being committed. The newer table of contents may include blocks that have been created by the transaction and may exclude blocks that have been abandoned by the transaction. In this embodiment, a snapshot to the ESS may be performed at any time during database operation except the short interval starting from the first server's creation of the table of contents to the last server's completion of creation of its table of contents.

Servers 16 may provide a network of processing nodes, where one or more of servers 16 may function as leader nodes that communicate with client 12 to acquire queries and/or deliver data for further processing on client 12. A leader node may further manage one or more of the other servers 16 acting as computing nodes to process a queries acquired by the leader node.

Local storages 18 corresponding to individual ones of servers 16 store part of the database copy contained within ESS 14. The architecture and/or configuration of the individual local storages 18 is not specified by system 10. For example, separate local storages 18 may be provided by different types of storage devices and/or such storage devices may have different configurations. In some implementations, a given local storage 18 may be partitioned to provide storage for other applications as well as the system described herein. For example, a given local storage 18 may use RAID5 for local performance and disk failover, may use RAID1 for local redundancy, etc.

The architecture and/or functionality of system 10 may enable each of servers 16 and the corresponding local storage 18 to function as an autonomous (or semi-autonomous) unit. For example, various aspects of the storage of a portion of the database on local storage 18 may be accomplished by server 16 without the need of organization/management from some centralized manager (e.g., provided at or with ESS 14).

Figure 2:
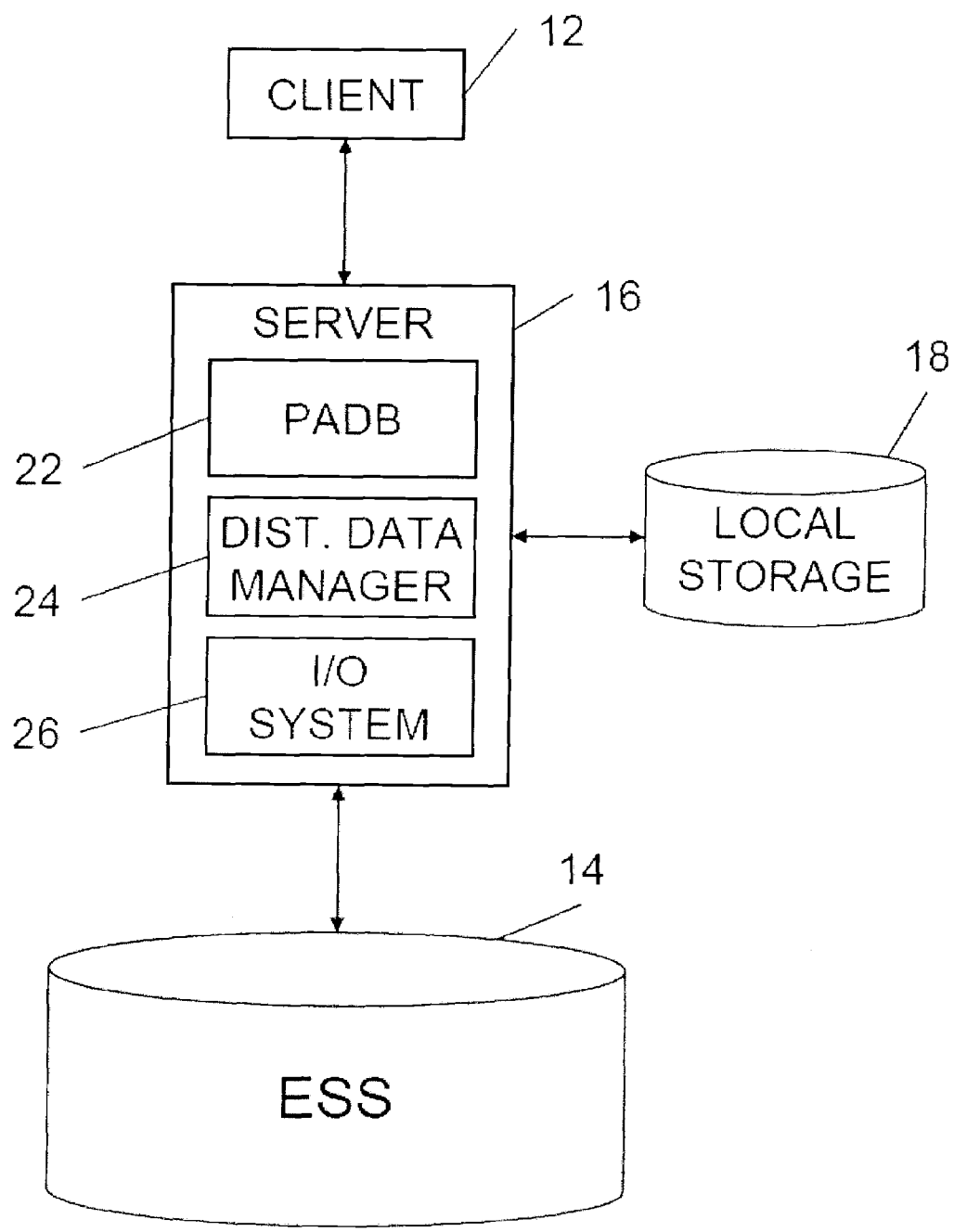
FIG. 2 illustrates a server, according to one or more embodiments of the invention.

FIG. 2 illustrates, with more detail than is shown in FIG. 1, a configuration of server 16 and local storage 18 within system 10, in accordance with one or more embodiments of the invention. As can be seen in FIG. 2, server 16 may include one or more of a database engine 22, a distributed data manager 24, an I/O system 26, and/or other components. One or more of the components may be provided by modules being executed on one or more processors. A processor may include one or more of a central processing unit, a digital circuit, an analog circuit, a state machine, a field-programmable gate array, and/or other processors. One or more of database engine 22, distributed data manager 24, and/or I/O system 26 may be implemented in hardware, software, firmware, and/or some combination of hardware, software, and/or firmware.

In some implementations, database engine 22 may include an application capable of managing communication with client 12 (e.g., receiving queries, outputting results, etc.), receiving data from data sources to be written to the database, receiving deletions and/or updates to the data contained within the database, managing queries received from client 12, obtaining data from the database to process the data in accordance with queries from client 12, processing data from the database in accordance with queries received from client 12, and/or other tasks with respect to the database.

According to various implementations, distributed data manager 24 may manage transactions between database engine 22 and the database such that the parallel storage of the database between local storage 18 and ESS 14 may be transparent to database engine 22. In other words, the logical view of the representation of data within the database from the point of view of database engine 22 (e.g., LUN, block format, block layout, file system/raw device, etc.) may be the same for data stored on both local storage 18 and ESS 14. As such, physical knowledge of where data is actually stored (within local storage 18 and/or ESS 14) may be maintained by distributed data manager 24. Further, transactions between database engine 22 and the database through I/O system 26 may be routed through distributed data manager 24 to ensure that data is received from and/or written to the appropriate storage locations.

If database engine 22 generates a request to receive data from the database, distributed data manager 24 may map the request to portions of the requested data stored in each of local storage 18 and ESS 14 so that separate portions of the data are read out from local storage 18 and ESS 14 in parallel fashion, thereby enhancing I/O performance and throughput. The proportions of the data portions read from local storage and ESS 14, respectively, may be a function of (i) data throughput between server and 16 local storage 18, and (ii) data throughput between ESS 14 and server 16. In some implementations, the proportions of the data portions read out from the separate sources may be determined according to a goal of completing the data read out from local storage 18 and the data read out from ESS 14 at approximately the same time. For example, in a configuration where overall data throughput between local storage 18 and server 16 is 800 MB/s, and throughput between ESS 14 and server 16 is 400 MB/s, distributed data manager 24 may map a request for data from the database to a request from local storage for ⅔ of the requested data and a separate request from ESS 14 for the remaining ⅓ of the requested data.

Where processing a request causes database engine 22 to generate intermediate data, distributed data manager 24 may manage the storage of the intermediate data to one or both of ESS 14 and/or local storage 18. The determination as to whether the intermediate data should be written to ESS 14, local storage 18, or some combination of ESS 14 and local storage 18 (and the proportions that should go to each of ESS 14 and local storage 18) may be based on capacity, utilization, throughput, and/or other parameters of ESS 14 and/or local storage 18.

In some implementations, distributed data manager 24 may control the portion of the database that is written to local storage 18. The proportion of the database included in this portion may be a function of one or more of available storage space in local storage 18 (e.g., larger available storage may receive a larger proportion of the database), data throughput between local storage 18 and server 16 (e.g., the faster data can be read out from local storage 18 to server 16, the larger the proportion saved to local storage 18 may be), ESS 14 utilization (e.g., the heavier utilization of ESS 14, the larger the proportion saved to local storage 18 may be), and/or other parameters that impact the storage of information to local storage 18 and/or the communication of information between server 16 and local storage 18. For example, if throughput between local storage 18 and server 16 is twice as fast as throughput between ESS 14 and server 16 (as was the case in the exemplary configuration described above), distributed data manager 24 may cause ⅔ of the database to be stored in local storage 18. Of course, this distribution may further be impacted by one or more other parameters (e.g., those enumerated in this paragraph).

Distributed data manager 24 may control which data within the database will be included in the portion of the database stored to local storage 18. The determination as to which data should be stored to local storage may be based on parameters related to the data such as, for example, whether data is persistent, temporary, intermediate, and/or other parameters. The determination may be related to one or more system parameters, such as, for example, capacity, utilization, throughput, and/or other parameters of ESS 14 and/or local storage 18.

Distributed data manager 24 may control the manner in which data from the database is physically stored on local storage 18. For example, distributed data manager 24 may ensure that data is stored on the outer tracks of disks forming local storage 18 (e.g., to facilitate read-out). In some instances, distributed data manager may ensure that the data from the database is balanced between the disks forming local storage 18 to alleviate "hot spots" and/or other adverse impacts of unbalanced storage.

In certain implementations, distributed data manager 24 may perform periodic audits of one or more system parameters that may impact the amount of data that should be included within the portion of the database stored to local storage 18. These system parameters may include one or more of data throughput between server 16 and local storage 18, data throughput between server 16 and ESS 14, ESS 14 utilization, local storage 18 utilization, storage location on local storage 18, and/or other system parameters. Upon performing such an audit, distributed data manager 24 may migrate data between local storage 18 and ESS 14 and/or may relocate the physical storage of data on local storage 18 in order to compensate for changes in the system parameters audited (e.g., where the throughput between 16 server and local storage 18 decreases, the portion of the database stored within local storage is decreased).

When data is entered to system 10 (e.g., through an external data source, through client 12, etc.), distributed data manager 24 may write the data to the database, ensuring that it is stored appropriately at ESS 14 and/or local storage 18. Upon receiving data, distributed data manager 24 may organize the data into blocks. A block of data may form the smallest unit of physical storage allocated to local storage 18. By way of non-limiting example, a block of data may comprise columnar values of the database, row values of the database, and/or other blocks of data from the database. Blocks of data may hold data from the database in raw or compressed form. The blocks may then be directed by distributed data manager 24, through I/O system 26, to ESS 14 to be written to the database. Distributed data manager 24 may determine whether some or all of the new blocks should be included within the portion of the database stored on local storage 18 to maintain the appropriate proportion of the database on local storage 18, and may direct the appropriate blocks, through I/O system 26, to local storage 18.

Similarly, if data is deleted from and/or updated in system 10, (e.g., through an external data source, through client 12, etc.), distributed data manager 24 may map the deletions and/or updated data to the appropriate locations on ESS 14 and/or local storage 18. Further, distributed data manager 24 may determine whether the changes to the data caused by the deletions and/or updates have given rise to a need for the portion of the database stored within local storage 18 to be adjusted to maintain the appropriate proportion between the portion of the database stored on local storage 18 and the database as a whole.

As should be appreciated from the foregoing, each server 16 of system 10 includes its own distributed data manager 24 capable of managing the storage of data on local storage 18, accessing data from the database, handling deletions and/or updates to the database, and/or performing other tasks related to the database in an autonomous (or semi-autonomous) manner. Further, although the processing of the database in accordance with a query from client 12 may be performed in cooperation by a plurality of servers 16, each server 16 may manage its own distinct subset of the requisite processing in an autonomous (or semi-autonomous) manner. This may present an advantage over conventional systems utilizing centralized storage of the database, such as a SAN, in that the operation of individual servers 16 does not rely on a centralized management processor to facilitate database operations on the server level.

Figure 3:
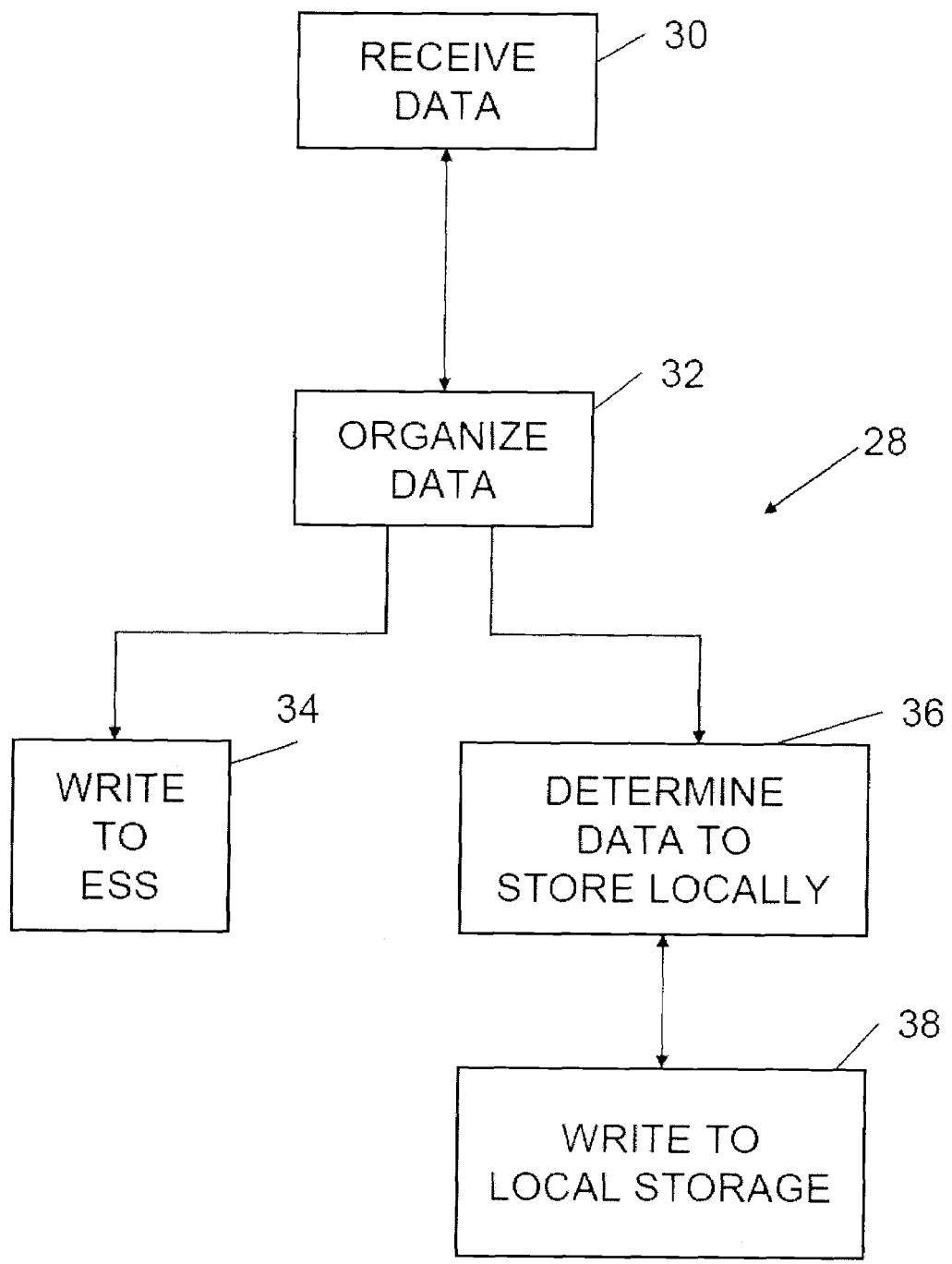
FIG. 3 illustrates a method of loading data (e.g., from an external data source) to the database, in accordance with one or more embodiments of the invention.

FIG. 3 illustrates a method 28 of loading data (e.g., from an external data source) to the database. Although the operations of method 28 are discussed below with respect to the components of system 10 described above and illustrated in FIGS. 1 and 2, it should be appreciated that this is for illustrative purposes only, and that method 28 may be implemented with alternative components and/or systems without departing from the scope of this disclosure. Further, the operations of method 28 presented be low are intended to be illustrative. In some embodiments, method 28 may be accomplished with one or more additional operations not described, and/or without one or more of the operations discussed. Additionally, the order in which the operations of method 28 are illustrated in FIG. 3 and described below is not intended to be limiting.

Method 28 includes an operation 30, at which data may be received from an external data source. In some embodiments, operation 30 may be performed by a database engine of a database server similar to, or the same as, database engine 22 of server 16, illustrated in FIG. 2 and described above.

At an operation 32, the data received at operation 30 may be organized into blocks for storage in the database. In some embodiments, operation 30 may be performed by a distributed data manager of a database server similar to distributed data manager 24, illustrated in FIG. 2 and described above.

At an operation 34, the data blocks formed at operation 32 may be written to an ESS (e.g., such as ESS 14, shown in FIGS. 1 and 2 and described above). In some embodiments, operation 32 may be performed by the distributed data manager.

At an operation 36, a determination is made as to whether any of the newly added data should be stored locally to the database server. This determination may be made to maintain a portion of the database on storage local to the server (e.g., local storage 18, illustrated in FIGS. 1 and 2, and described above) with a predetermined proportion to the database as a whole. The distributed data manager of the database server may make this determination based on one or more of the parameters discussed above with respect to distributed data manager 24 (illustrated in FIG. 2).

At an operation 38, the portion of the newly added data, if any, is written to storage that is local to the server. Operation 38 may be performed by the distributed data manager.

Figure 4:
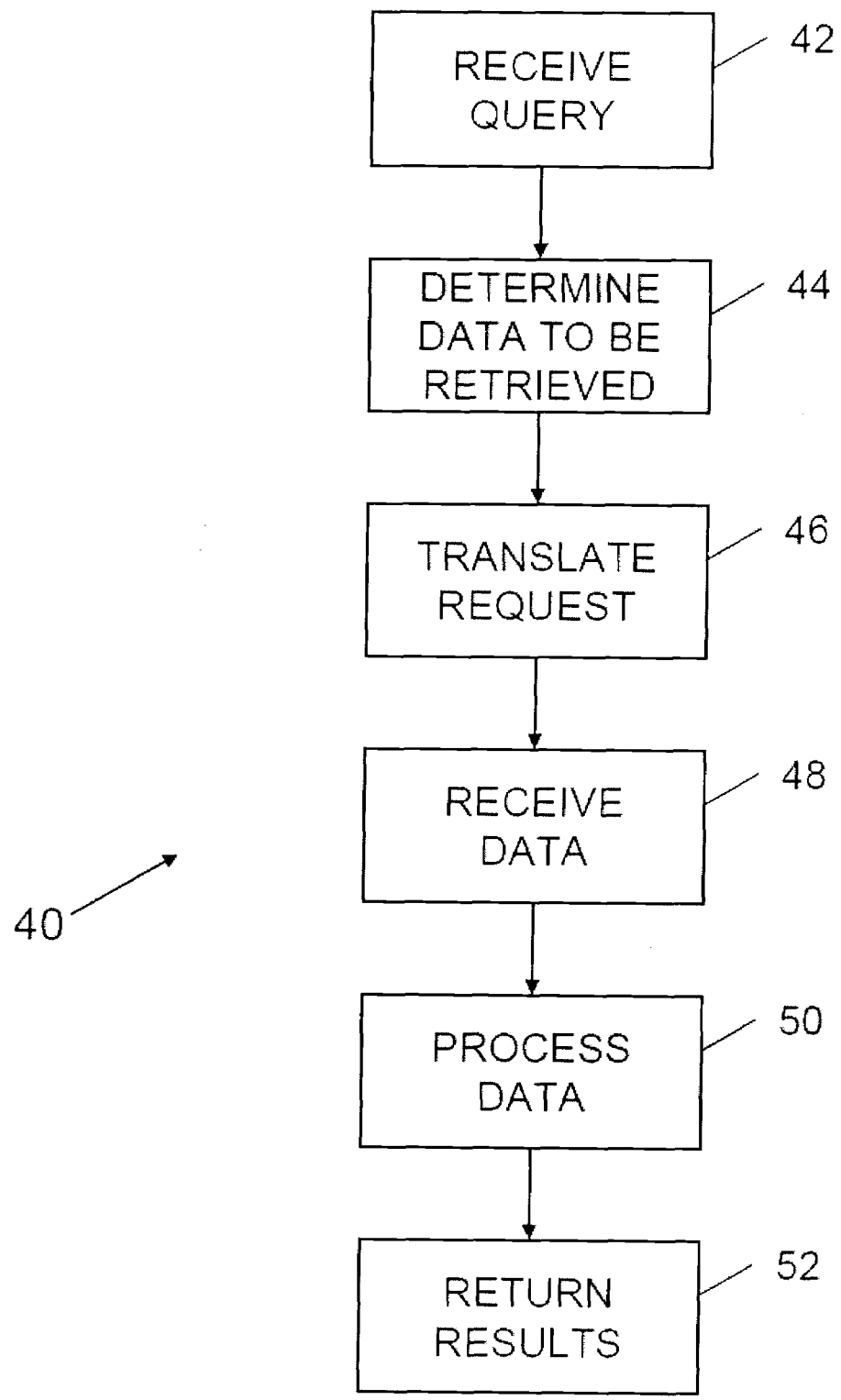
FIG. 4 illustrates a method 40 of receiving and processing a query on a database, according to one or more embodiments of the invention.

FIG. 4 illustrates a method 40 of receiving and processing a query on a database. Although the operations of method 40 are discussed below with respect to the components of system 10 described above and illustrated in FIGS. 1 and 2, it should be appreciated that this is for illustrative purposes only, and that method 40 may be implemented with alternative components and/or systems without departing from the scope of this disclosure. Further, the operations of method 40 presented be low are intended to be illustrative. In some embodiments, method 40 may be accomplished with one or more additional operations not described, and/or without one or more of the operations discussed. Additionally, the order in which the operations of method 40 are illustrated in FIG. 4 and described below is not intended to be limiting.

At an operation 42, a query may be received. The query may be received from a database client, such as client 12, shown in FIGS. 1 and 2 and described above. In some embodiments, operation 42 may be performed by a database engine of a database server that is similar to, or the same as, database engine 22 of server 16, illustrated in FIGS. 1 and 2 and described above.

At an operation 44, a determination may be made as to which data in the database should be retrieved in order to process the query received at operation 42, and a request for this data may be generated. In some embodiments of the invention, operation 44 may be performed by the database engine.

At an operation 46, the request generated at operation 44 may be translated to retrieve separate portions of the requested data in parallel from an ESS (e.g., ESS 14 shown in FIGS. 1 and 2 and described above) and storage that is local to the server (e.g., local storage 18 shown in FIGS. 1 and 2 and described above). The portions of the requested data may be determined based on the relative throughputs of the ESS and the local storage to the server with the intention that both of the retrievals will take the approximately the same amount of time. In some embodiments, operation 46 may be performed by a distributed data manager of the server that is the same as or similar to distributed data manager 24 shown in FIG. 2 and described above.

At an operation 48, the separate data portions determined at operation 46 may be received by the database server, and at an operation 50, the received data may be processed in accordance with the query received at operation 42. In some instances, the processing of the received data involves the materialization of intermediate data. Such intermediate data may be stored in local storage and/or stored in the ESS based on user configurable settings. In some implementations, the user configurable settings may depend on one or more criteria, such as, for example, capacity utilization, throughput balancing, and/or storage balancing. In some embodiments, the processing of data at operation 50 may be performed by the database engine, while the storage and/or retrieval of intermediate data may be managed by the distributed data manager.

At an operation 52, the results of the processing performed at operation 52 may be returned to the querying client. In some embodiments, operation 52 may be performed by the database engine.

Figure 5:
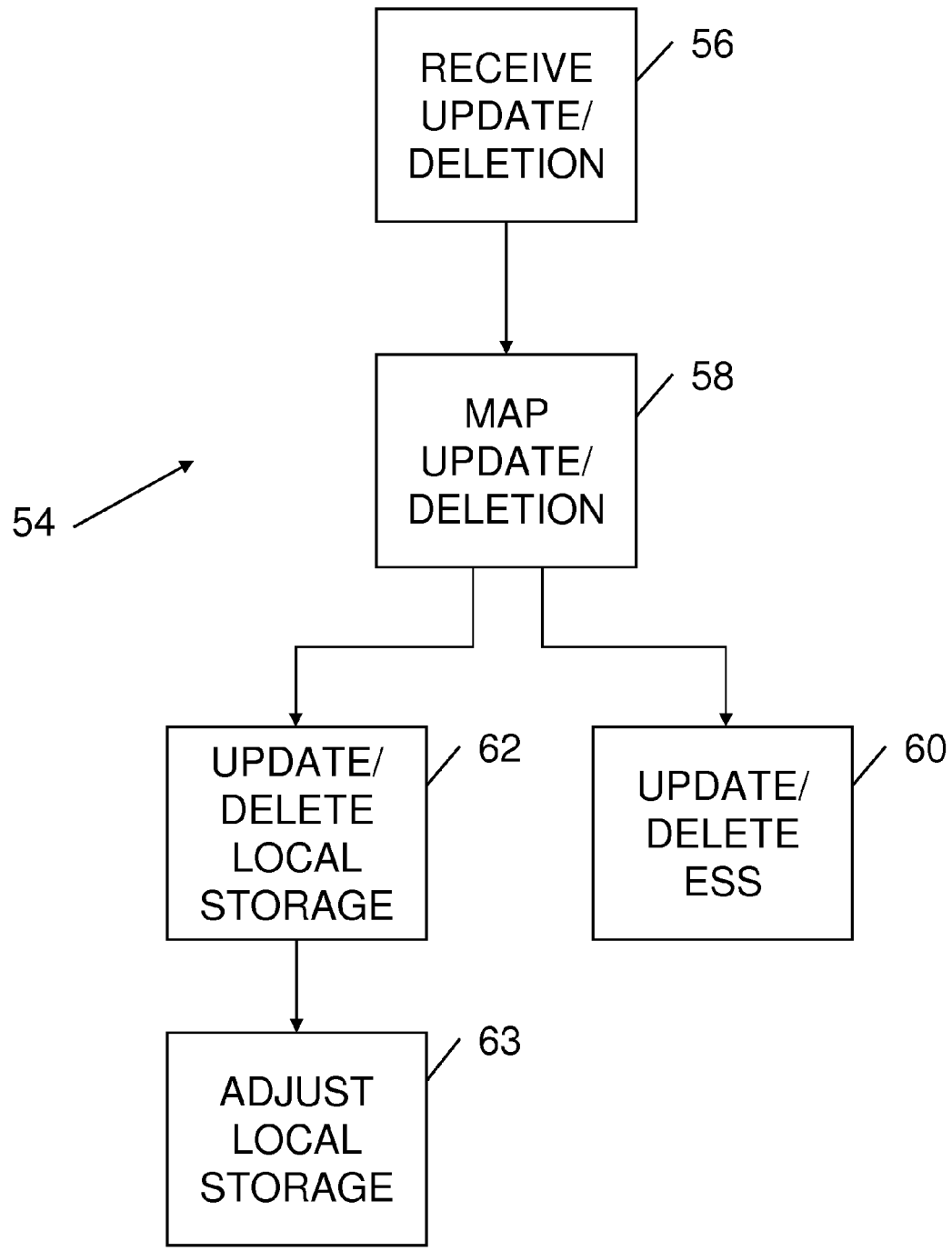
FIG. 5 illustrates a method 54 of deleting and/or updating data within the database, in accordance with one or more embodiments of the invention.

FIG. 5 illustrates a method 54 of deleting and/or updating data within the database. Although the operations of method 54 are discussed below with respect to the components of system 10 described above and illustrated in FIGS. 1 and 2, it should be appreciated that this is for illustrative purposes only, and that method 54 may be implemented with alternative components and/or systems without departing from the scope of this disclosure. Further, the operations of method 54 presented be low are intended to be illustrative. In some embodiments, method 54 may be accomplished with one or more additional operations not described, and/or without one or more of the operations discussed. Additionally, the order in which the operations of method 54 are illustrated in FIG. 5 and described below is not intended to be limiting.

At an operation 56, an update and/or deletion to data within the database may be received and a command to update and/ or delete the appropriate data may be generated. In some embodiments, operation 56 may be performed by a database engine of a database server that is the same as, or similar to, database engine 22 shown in FIG. 2 and described above.

At an operation 58, the update and/or deletion to data within the database is mapped to the appropriate data stored within an ESS (e.g., ESS 14 shown in FIGS. 1 and 2 and described above) that holds the database. In some instances, the data may further be held within a portion of the database stored locally by the database server (e.g., within local storage 18 shown in FIGS. 1 and 2 and described above). In these instances, the update and/or deletion may be mapped to the appropriate data within the local storage. In some embodiments, operation 58 may be performed by a distributed data manager of the server that is the same as or similar to distributed data manager 24 shown in FIG. 2 and described above.

At an operation 60, the appropriate data stored on the ESS is updated and/or deleted, and at an operation 62, the appropriate data stored on the local server is updated and/or deleted. At an operation 63, the proportion of the portion of the database stored on the local storage to the database as a whole is adjusted to account for the update and/or deletion of data performed at operations 60 and 62. In some embodiments, operation 63 may be performed by the distributed data manager to maintain the appropriate balance between the portion of the database stored on the local storage and the database as a whole in the manner described above with respect to distributed data manager 24.

Figure 6:
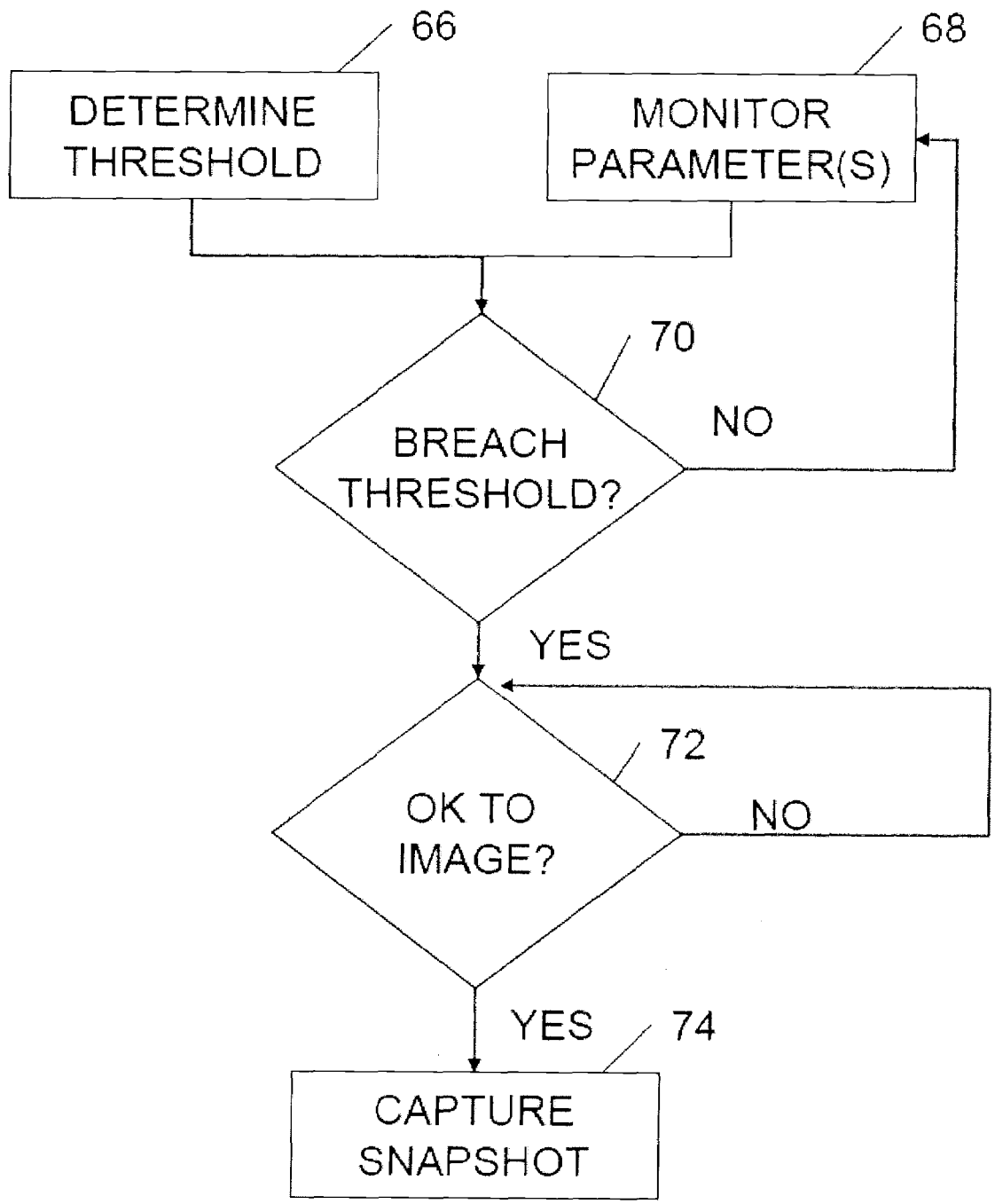
FIG. 6 illustrates a method 64 capturing a snapshot of a database, according to one or more embodiments of the invention.

FIG. 6 illustrates a method 64 capturing a snapshot of a database without manually isolating the database from queries to update the database and/or create an artificially quiescent database. Although the operations of method 64 are discussed below with respect to the components of system 10 described above and illustrated in FIGS. 1 and 2, it should be appreciated that this is for illustrative purposes only, and that method 64 may be implemented with alternative components and/or systems without departing from the scope of this disclosure. Further, the operations of method 64 presented be low are intended to be illustrative. In some embodiments, method 64 may be accomplished with one or more additional operations not described, and/or without one or more of the operations discussed. Additionally, the order in which the operations of method 64 are illustrated in FIG. 6 and described below is not intended to be limiting.

At an operation 66, a threshold of one or more parameters related to the obsolescence of a previous snapshot is determined. The threshold may be determined based on one or more of a user configuration, a system parameter, a hard-coded (e.g., permanent) threshold, and/or otherwise determined. In some embodiments, operation 66 may be determined by an data imaging module that is the same as, or similar to, data imaging module 20 shown in FIG. 1 and described above.

At an operation 68, the one or more parameters related to the obsolescence of the previous snapshot are monitored. In some embodiments, operation 68 may be performed by the data imaging module.

At an operation 70, a determination may be made as to whether the one or more monitored parameters have breached the threshold. In some embodiments, operation 70 may be preformed by the data imaging module. If the one or more parameters have not breached the threshold, then method 64 may return to operation 68. If the one or more parameters have breached the threshold, then method 64 may proceed to an operation 72.

At operation 72, a determination may be made as to whether a snapshot may be captured. The determination of operation 72 may include, for example, a determination as to whether any queries are currently being processed on the database, a determination as to whether any queries being executed update persistent data in the database, and/or other determination related to whether the database is sufficiently quiescent for a snapshot to be taken. In some embodiments, operation 72 may be preformed by the data imaging module.

At an operation 74, a snapshot of the database may be obtained. The snapshot may include an image of the database that can be used to restore the database to its current state at a future time. In some embodiments, operation 74 may be preformed by the data imaging module.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A database system comprising:
a first electronic storage that holds a complete copy of a database, the first electronic storage corresponding to an external storage system having a first data transfer rate to a database server;
a second electronic storage that is separate from the first electronic storage, the second electronic storage holding at least a portion of the database, the second electronic storage corresponding to a local storage of the database server, the second electronic storage having a second data transfer rate to the database server, the second data transfer rate being faster than the first data transfer rate; and
the database server configured to:
receive a database query;
read data requested in the database query in parallel from the first electronic storage and the second electronic storage;
responsive to receipt of the database query, determine a size of a first portion of a set of result data for the database query from the first electronic storage and a size of a second portion of the set of result data for the database query from the second electronic storage based on a data throughput between the database server and the first electronic storage and a data throughput between the database server and the second electronic storage such that a retrieval, by the database server, of the first portion from the first electronic storage and the second portion from the second electronic storage in parallel takes approximately the same time;
configure a first request for the first portion and a second request for the second portion;
send the first request to the first electronic storage and the second request to the second electronic storage, retrieve the first portion from the first electronic storage and the second portion from the second electronic storage in parallel and send a response to the database query based on the first portion and the second portion.

2. The system of claim 1, wherein the data throughput between the database server and the first electronic storage is measured at or near receipt of the database query.

3. The system of claim 1, wherein the proportion of the portion of the database stored on the second electronic storage to the whole database is adjusted to account for a change in utilization of the first electronic storage.

4. The system of claim 1, further comprising:
a second database server remote from the external storage system that is in communication with the first electronic storage to perform transactions with the database copy held on the external storage system;
third electronic storage that is logically and physically separate and discrete from each of the first electronic storage and the second electronic storage, the third electronic storage holding at least a portion of the database,
wherein the portion of the database held on the second electronic storage is determined based on the data throughput between the database server and the first electronic storage and the data throughput between the database server and the second electronic storage, and
wherein the portion of the database held on the third electronic storage is determined based on a data throughput between the second database server and the first electronic storage and a data throughput between the second database server and the third electronic storage.

5. The system of claim 4, wherein the database server determines the portion of the database that is held on the second electronic storage autonomously, and wherein the second database server determines the portion of the database that is held on the third electronic storage autonomously.

6. The system of claim 5, wherein the database server determines the portion of the database that is held on the second electronic storage further based on one or more of storage capacity of the second electronic storage, performance of the second electronic storage, or availability of the first electronic storage, and wherein the second database server determines the portion of the database that is held on the third electronic storage further based on one or more of storage capacity of the third electronic storage, performance of the third electronics storage, or availability of the first electronic storage.

7. The system of claim 1, wherein the first electronic storage is associated with a Storage Area Network.

8. The system of claim 1, wherein the first electronic storage is available to one or more other database servers, and wherein the second electronic storage is direct-attached storage to the database server.

9. A database system comprising:
a database server configured to retrieve data of a database from a first electronic storage and a second electronic storage, the first electronic storage separate from the second electronic storage, the first electronic storage holding a complete copy of the database, and the second electronic storage holding at least a portion of the database, the first electronic storage corresponding to an external storage system having a first data transfer rate to a database server, the second electronic storage corresponding to a local storage of the database server, the second electronic storage having a second data transfer rate to the database server, the second data transfer rate being faster than the first data transfer rate;
the database server configured to:
receive a database query;
read data requested in the database query in parallel from the first electronic storage and the second electronic storage;
responsive to receipt of the database query, determine a size of a first portion of a set of result data for the database query from the first electronic storage and a size of a second portion of the set of result data for the database query from the second electronic storage based on a data throughput between the database server and the first electronic storage and a data throughput between the database server and the second electronic storage such that a retrieval, by the database server, of the first portion from the first electronic storage and the second portion from the second electronic storage in parallel takes approximately the same time;
configure a first request for the first portion and a second request for the second portion;
send the first request to the first electronic storage and the second request to the second electronic storage, retrieve the first portion from the first electronic storage and the second portion from the second electronic storage in parallel and send a response to the database query based on the first portion and the second portion.

10. The system of claim 9, wherein the database server is further configured to measure the data throughput between the database server and the first electronic storage at or near receipt of the database query.

11. The system of claim 9, wherein the database server is further configured to adjust the proportion of the portion of the database stored on the second electronic storage to the whole database to account for a change in utilization of the first electronic storage.

12. The system of claim 9, wherein the first electronic storage is associated with a Storage Area Network.

13. The system of claim 9, wherein the first electronic storage is available to one or more other database servers, and wherein the second electronic storage is direct-attached storage to the database server.

14. A method for retrieving data from a database in response to a database query comprising:

receiving, by a database server, a database query;

configuring a first request for a first portion of a set of result data for the database query from a first electronic storage that holds a complete copy of the database, the first electronic storage corresponding to an external storage system having a first data transfer rate to a database server;

configuring a second request for a second portion of the set of result data for the database query from a second electronic storage that is separate from the first electronic storage, the second electronic storage holding at least a portion of the database, the second electronic storage corresponding to a local storage of the database server, the second electronic storage having a second data transfer rate to the database server, the second data transfer rate being faster than the first data transfer rate;

responsive to receipt of the database query, determining a size of the first portion and a size of the second portion based on a data throughput between the database server and the first electronic storage and a data throughput between the database server and the second electronic storage such that a retrieval of the first portion from the first electronic storage and the second portion from the second electronic storage in parallel takes approximately the same time;

sending the first request to the first electronic storage and the second request to the second electronic storage, retrieving the first portion from the first electronic storage and the second portion from the second electronic storage in parallel, and sending a response to the database query based on the first portion and the second portion.

15. The method of claim 14, wherein the data throughput between the database server and the first electronic storage is measured at or near receipt of the database query.

16. The method of claim 14, wherein the proportion of the portion of the database stored on the second electronic storage to the whole database is adjusted to account for a change in utilization of the first electronic storage.

17. The method of claim 14, wherein the database server determines the portion of the database that is held on the second electronic storage autonomously.

18. The method of claim 14, wherein the database server determines the portion of the database that is held on the second electronic storage further based on one or more of storage capacity of the second electronic storage, performance of the second electronic storage, or availability of the first electronic storage.

* * * * *